United States Patent Office 3,305,502
Patented Feb. 21, 1967

3,305,502
PROCESS FOR CURING DIORGANO POLY-
SILOXANES AT ROOM TEMPERATURE
Warren R. Lampe, Colonie, N.Y., assignor to General
Electric Company, a corporation of New York
No Drawing. Filed Dec. 16, 1963, Ser. No. 330,652
3 Claims. (Cl. 260—18)

This invention relates to the curing of organopolysiloxane elastomer compositions. More particularly, this invention relates to curing compositions useful for curing thick sections of room temperature curing organopolysiloxanes and to the use of such curing compositions.

Room temperature curing or room temperature vulcanizing organopolysiloxanes are known in the art and have become valuable items of commerce. These room temperature curing organopolysiloxanes are compositions which vary from thin liquids to thick pastes and which can be spread on various surfaces and allowed to cure to silicone rubber at room temperature. One type of organopolysiloxane which is room temperature vulcanizing and which has obtained especially wide acceptance in the art is the type described in Patent 2,843,555—Berridge, which issued July 15, 1958. The room temperature curing organopolysiloxanes described in the aforementioned Berridge patent comprise a linear, fluid organopolysiloxane containing terminal silicon-bonded hydroxy groups and having an average of about two organic groups per silicon atom and an alkyl silicate. These room temperature vulcanizing organopolysiloxanes also often contain a suitable filler.

These compositions are converted to the cured, solid, elastic state by adding a suitable catalyst, which is most often a metallic salt of an organic carboxylic acid in which the metallic ion is selected from the class consisting of lead, tin, zirconium, antimony, iron, cadmium, barium, calcium, titanium, bismuth and manganese.

While the compositions described in the aforementioned Berridge patent can be satisfactorily cured in thin sections by the catalysts described in the patent, it is found that the cure of thick sections often presents problems. Thus, for example, it is relatively simple to add the metallic salt catalyst to the curable composition and cure a layer of the material as thick as about ¼-inch. However, when an attempt is made to cure layers as thick as ½-inch or higher, it is found that either an excessively long period of time is required to effect a cure throughout the mass of the material or in some cases it is completely impossible to effect cure throughout the thickness of the material.

It is an object of the present invention to provide an improved catalyst system for room temperature vulcanizing organopolysiloxane elastomers.

It is a still further object of the present invention to provide an improved multi-component catalyst system for improving the thick section cure of room temperature curing organopolysiloxane elastomers.

These and other objects of my invention are accomplished by employing as a curing catalyst a composition comprising (A) a metallic salt of an organic carboxylic acid in which the metallic ion is selected from the class consisting of lead, tin, zirconium, antimony, iron, cadmium, barium, calcium, titanium, bismuth and manganese, (B) water, and (C) a mutual solvent for the metallic salt and the water. When this curing catalyst composition is added to a room temperature curing organopolysiloxane of the type described above, satisfactory cure of thick sections or thick masses of such room temperature curing organopolysiloxane is accomplished in the same time usually required for curing thinner sections of such material.

The proportions of the various components of the catalyst composition of the present invention can vary within extremely wide limits. For example, on the basis of 100 parts by weight of the metallic salt described above, the water can comprise from 1.0 to 5,000 parts by weight. The amount of mutual solvent for the water and metallic salt can vary within extremely wide limits, since the function of the solvent is merely to provide a single phase catalyst composition. Accordingly, the amount of solvent required in the catalyst composition ranges from the minimum amount necessary to form a homogeneous solution up to a large excess. Illustrative of the amounts of solvent which can be employed can be mentioned, for example, from 100 to 1,000 parts by weight solvent per 100 parts by weight of the aforementioned metal salt.

The various components of the catalyst composition of the present invention and of the room temperature curing organopolysiloxane elastomer which is cured by the catalyst composition are well known in the art.

The metallic cations of the salts employed in the catalyst compositions of the present invention have already been described. The anions are derived from organic carboxylic acids, preferably saturated aliphatic monocarboxylic acids, such as, for example, acetic acid, butyric acid, 2-ethylhexanoic acid, lauric acid, stearic acid, etc.; aliphatically unsaturated carboxylic acids, such as, for example, undecylenic acid, oleic acid, linoleic acid; as well as aryl-substituted acids, such as benzoic acid and naphthanoic acid.

Included among the metallic salts employed in the practice of the present invention are salts of the various carboxylic acids described above with metals of the class previously described, which salts contain metal-bonded hydrocarbon radicals. Typical of such compounds are dibutyl tin dilaurate and dibutyl tin dimaleate. Specific examples of other metal salts operative in the practice of the present invention include, for example, tin naphthanate, tin octoate, lead octoate, tin stearate, iron stearate, tin oleate, antimony octoate, tin butyrate, etc. The particular class of metal salts which are preferred are the tin salts of organic carboxylic acids, with the preferred specific salt being dibutyl tin dilaurate.

Solvents useful in the catalyst compositions of the present invention include any solvent which will dissolve both the metal salt of the organic carboxylic acid and water. Accordingly, it is obvious that to some extent the particular solvent employed and its concentration will be a function of the particular metal salt employed. In general, the solvents useful in the practice of the present invention are polar in nature, since polar solvents are obviously more suitable as solvents for both the metal salt and the water. Illustrative of such polar solvents can be mentioned, for example, the simple alkanols, such as ethyl alcohol, n-propyl alcohol, isopropyl alcohol, butanol, t-butyl alcohol, more complex alcohols, such as furfuryl alcohol and tetrahydrofurfuryl alcohol; cyclic ethers, such as the dioxanes, tetrahydrofuran, tetrahydropyran, etc.; halogenated alkanes, such as 1,1,1-trichloroethane; alkyl alkane phosphonates, such as diethyl butane phosphonate, dibutyl butane phosphonate, dibutyl ethane phosphonate, etc.; various alkyl cyanides, such as acetonitrile, proprionitrile, etc.

The linear, fluid organopolysiloxanes containing silicon-bonded hydroxyl groups and having an average of two organic groups per silicon atom which are a component of the room temperature vulcanizing organopolysiloxane elastomers which can be cured with the catalyst compositions of the present invention are well known in the art and generally have the general formula:

(1)
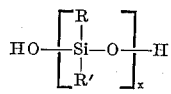

where R and R' are members selected from the class consisting of monovalent hydrocarbon radicals, halogenated monovalent hydrocarbon radicals and cyanoalkyl radicals and $x$ has a value of at least about 5, e.g., from 10 to 1,000 or more. These materials are often known as silanol chain-stopped diorganopolysiloxanes. Included among the radicals represented by R and R' are, for example, alkyl radicals, e.g., methyl, ethyl, propyl, butyl, octyl, etc. radicals; alkenyl radicals, e.g., vinyl, allyl, hexenyl, etc. radicals; cycloaliphatic hydrocarbon radicals such as cyclohexyl, cycloheptyl, cyclohexenyl, etc. radicals; aryl radicals, e.g., phenyl, tolyl, xylyl, napthyl, etc. radicals; aralkyl radicals, e.g., benzyl, phenylethyl, etc. radicals; halogenated monovalent hydrocarbon radicals such as, for example, chlorophenyl, tetrachlorophenyl, difluorophenyl, chloromethyl, pentafluorobutyl, trifluoromethylvinyl, trifluoromethylphenyl, etc. radicals; cyanoalkyl radicals, e.g., beta-cyanoethyl, beta-cyanopropyl, gamma-cyanopropyl, delta-cyanobutyl, etc. radicals. Preferably, the radicals represented by R and R' of Formula 1 are both methyl radicals. Where the radicals represented by R and R' include radicals other than methyl radicals, it is preferable that at least 50% of the radicals are methyl radicals. The organopolysiloxanes of Formula 1 can vary from thin liquids to materials of extremely high viscosity, such as high viscosity gums. Preferably, the materials within the scope of Formula 1 have a viscosity of from about 50 to 100,000 centipoise when measured at 25° C.

The alkyl silicates employed in the room temperature vulcanizing silicone rubber compositions of the present invention which are curable by the catalyst compositions of the present invention are selected from the class consisting of (a) monomeric organosilicates corresponding to the general formula:

(2) 

where Y is a member selected from the class consisting of alkyl groups and halogen-substituted alkyl groups and Y' represents a member selected from the class consisting of alkyl groups and halogen-substituted alkyl groups and halogenated derivatives of the aforesaid alkyl, aryl, aralkyl, alkoxy and aryloxy groups and (b) liquid partial hydrolysis products of the aforementioned monomeric organosilicates. Illustrative of specific radicals represented by Y or Y' in Formula 2 can be mentioned, for example, methyl, ethyl, propyl, isopropyl, butyl, amyl, isoamyl, octyl, isooctyl, decyl, dodecyl, chloromethyl, beta-chloroethyl, phenyl, tolyl, xylyl, benzyl, methoxy, phenoxy, etc. radicals. One very useful class of monomeric organosilicates corresponding to Formula 2 are those corresponding to the general formula $(Y''O)_4Si$ where Y'' is an alkyl group.

In addition to employing the liquid monomeric organosilicates described above in the practice of the present invention, it is also possible to use liquid partially hydrolyzed products derived therefrom. Such hydrolysis products are generally obtained by effecting partial hydrolysis in water of the particular monomeric organosilicate in the presence of small amounts of acid to a point where it is still water-insoluble and it is still possible to isolate a liquid, partially hydrolyzed organosilicon compound. Thus, taking as a specific example the controlled partial hydrolysis of ethyl orthosilicate, the hydrolysis can be carried out by adding acids or acid-forming metal salts to the liquid monomeric ethyl orthosilicate, such acids and salts including, for example, ferric chloride, cupric chloride, aluminum chloride, stannic chloride, etc., and thereafter effecting suitable hydrolysis of this mixture of ingredients in water to obtain a two-phase composition from which the water-insoluble, partially hydrolyzed organosilicate can be readily separated from the aqueous phase and catalyst.

The room temperature vulcanizing organopolysiloxane elastomers useful with the catalyst compositions of the present invention can also contain various fillers. Among such fillers are, for example, titanium dioxide, lithopone, zinc oxide, zirconium silicate, silica aerogel, iron oxide, diatomaceous earth, calcined clay, calcium carbonate, fume silica, precipitated silica, quartz powder, glass fibers, carbon black, powdered polyethylene and polyvinyl chloride, etc. In addition to using a single filler in the compositions, mixtures of various fillers can be employed.

The room temperature curing organopolysiloxanes can contain wide variations of the proportions of the linear fluid organopolysiloxane, the alkyl silicate and the filler. It is generally found that the alkyl silicate is advantageously present, by weight, in an amount equal to from about 0.1 to 5 or 10 or more parts by weight per 100 parts by weight of the linear fluid organopolysiloxane. The amount of filler can also vary within wide limits, for example, from about 10 to 300 parts by weight of filler per 100 parts by weight of the organopolysiloxane containing terminal silicon-bonded hydroxyl groups. The exact amount of filler used will depend upon such factors as the application intended for the room temperature curable organopolysiloxane, the type of filler employed, the type of linear fluid organopolysiloxane employed, etc.

In order to prepare the room temperature curing organopolysiloxane, the components are merely mixed together in any suitable fashion. Generally, the alkyl silicate and the filler are mixed with the linear fluid organopolysiloxane in a suitable vessel equipped with agitation means.

In order to use the catalyst compositions of the present invention in the curing of room temperature curing organopolysiloxanes, the catalyst compositions are simply added to the curable organopolysiloxanes in the desired amount by any suitable means. Such addition can be effected on rubber milling rolls where the room temperature curing organopolysiloxane has a sufficiently high viscosity or the catalyst composition can be added in a suitable vessel equipped with stirring means. The amount of catalyst composition employed for curing the room temperature curing organopolysiloxane can vary within extremely wide limits. It has been found, however, that satisfactory curing is obtained when the catalyst composition is employed in an amount sufficient to provide from about 0.01 to 5% by weight of the metal ion in the catalyst composition, based on the total weight of the linear fluid organopolysiloxane containing terminal silicon-bonded hydroxyl groups in the room temperature curing organopolysiloxanes. Also, the amount of catalyst composition is selected to provide from 0.01 to 0.5 percent water, based on the weight of the fluid organopolysiloxanes.

The following examples are illustrative of the practice of my invention and are not intended for purposes of limitation. All parts are by weight.

In the examples, the effectiveness of a given catalyst composition for curing thick sections of room temperature vulcanizing silicone elastomers was determined by catalyzing the room temperature curing organopolysiloxane with the particular catalyst under consideration and thereafter pouring a portion of the catalyzed composition into an aluminum cup to a depth of $^{11}/_{16}$-inch. The cup was then maintained for 24 hours at 25° C. and the Shore A hardness of the top of the sample and the bottom of the sample (adjacent the cup surface) were measured. If at the end of this time the Shore A hardness value of the bottom of the sample was not at least 50% of the Shore A hardness value of the top of the sample, the sample was considered to have an unsatisfactory thick section cure.

Example 1

In this example, the room temperature vulcanizing silicone elastomer composition was prepared according to the teachings of Example 1 of Patent 2,843,555—Berridge, by mixing 100 parts of a 2,000 centipoise linear fluid dimethylpolysiloxane having terminal silicon-bonded hydroxyl groups with 20 parts diatomaceous earth, 20 parts zinc oxide, 30 parts calcined clay and 2 parts of a liquid, water-insoluble hydrolysis product of ethyl orthosilicate. The ethyl orthosilicate hydrolysis product was the commercial material sold under the name of Ethyl Silicate 40 and was a mixture of ethyl polysilicates having about 40% available silica and was derived from the controlled hydrolysis of tetraethyl silicate, and contained an average of about five silicon atoms per molecule. A catalyst composition within the scope of the present invention was prepared by mixing 100 parts dibutyl tin dilaurate, 220 parts isopropanol, 50 parts water and 100 parts dibutyl butane phosphonate. A sufficient amount of this catalyst composition was added to the room temperature vulcanizing organopolysiloxane composition to provide 0.08% tin, based on the weight of the 2,000 centipoise methylpolysiloxane. As controls, separate portions of the room temperature vulcanizing organopolysiloxane compositions were catalyzed with a sufficient amount of dibutyl tin dilaurate to provide, respectively, 0.06% tin and 0.19% tin, based on the weight of the dimethylpolysiloxane. In Table I below are listed the results of the thick section cure test described above for both of the controls and for the composition within the scope of the present invention which are shown under the heading "Aqueous."

TABLE I

| Catalyst | Run | | |
|---|---|---|---|
| | 1 | 2 | 3 |
| | Control, 0.06% Sn | Control, 0.19% Sn | Aqueous, 0.08% Sn |
| Top Hardness | 40 | 47 | 41 |
| Bottom Hardness | 0 | 7 | 30 |

As shown by the above data, the Shore A hardness of both of the controls indicates failure of deep section cure. For Run No. 1, the zero hardness reading at the bottom of the test sample indicates that no cure at all had taken place after 24 hours at 25° C. For Run No. 2, the hardness value of 7 indicates that only a minor amount of cure had taken place. In contrast to this, the hardness values determined for the control in Run 3 show satisfactory deep section cure.

Example 2

The room temperature vulcanizing silicone rubber composition employed in this example was prepared by mixing 100 parts of a 5,000 centipoise silanol chain-stopped copolymer of diphenylsiloxane units and dimethylsiloxane units containing 3% diphenylsiloxane units, with 40 parts of finely divided calcium carbonate and 3.5 parts of the aforementioned Ethyl Silicate 40. A portion of this room temperature vulcanizing composition was catalyzed with a sufficient amount of the catalyst composition of this invention described in Example 1 to provide 0.07% tin, based on the weight of the 5,000 centipoise diorganopolysiloxane fluid. As a control, another portion of the room temperature vulcanizing silicone composition was catalyzed with sufficient dibutyl tin dilaurate to provide 0.05% tin, based on the weight of the diorganopolysiloxane. In Table II below are listed the results of the deep section cure tests on these materials.

TABLE II

| Catalyst | Run | |
|---|---|---|
| | 4 | 5 |
| | Control, 0.05% Sn | Aqueous, 0.07% Sn |
| Top Hardness | 30 | 36 |
| Bottom Hardness | 0 | 35 |

As shown by the table, the control of Run No. 4 showed a Shore A hardness of zero on the bottom which indicates failure in deep section cure. On the other hand, the catalyst composition of the present invention, as shown by Run No. 5, exhibited satisfactory hardness at both the top and the bottom of the sample and therefore exhibited good deep section cure.

Example 3

The room temperature vulcanizing silicone rubber composition employed in this example was prepared by mixing 100 parts of a 4,000 centipoise silanol chain-stopped dimethylpolysiloxane, 40 parts of finely divided calcium carbonate and 3 parts of the aforementioned Ethyl Silicate 40. The catalyst composition employed in this example was prepared by mixing 100 parts dibutyl tin dilaurate, 320 parts isopropanol and 50 parts water. Two controls were prepared by mixing dibutyl tin dilaurate with the room temperature vulcanizing silicone rubber composition in sufficient amount to provide, respectively, 0.03 and 0.06 percent tin, based on the weight of the linear dimethylpolysiloxane. Two other samples were catalyzed by the catalyst composition described above, the first with sufficient catalyst composition to provide 0.03% tin and the second in sufficient amount to provide 0.07% tin, both percentages being based on the weight of the dimethylpolysiloxane. The results of the deep section cure test are shown in Table III below.

TABLE III

| Catalyst | Run | | | |
|---|---|---|---|---|
| | 6 | 7 | 8 | 9 |
| | Control, 0.03% Sn | Control, 0.06% Sn | Aqueous, 0.03% Sn | Aqueous, 0.07% Sn |
| Top Hardness | 40 | 40 | 40 | 41 |
| Bottom Hardness | 15 | 12 | 25 | 40 |

As in previous examples, the data set forth in Table III show that the controls (Runs 6 and 7) are unsatisfactory in deep section cure, while the compositions within the scope of the present invention (Runs 8 and 9) exhibit satisfactory deep section cure.

While the foregoing examples have illustrated several of the embodiments of my invention, it should be understood that this invention is broadly applicable to the class of catalyst compositions described above which comprise a metallic salt of the type described, water and a mutual solvent for the metallic salt and the water. These catalyst compositions are useful in a broad range of concentrations for effecting the cure of room temperature vulcanizing organopolysiloxanes of the type comprising a silanol chain-stopped diorganopolysiloxane fluid, an alkyl silicate and, optionally, a filler.

What I claim as new and desire to secure by Letters Patent of the United States is:

1. The process for curing a room temperature vulcanizing organopolysiloxane composition comprising a linear fluid diorganopolysiloxane having the formula:

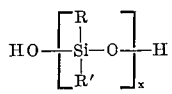

and an alkyl silicate, where R and R' are members selected from the class consisting of monovalent hydrocarbon radicals, halogenated monovalent hydrocarbon radicals and cyanoalkyl radicals and $x$ has a value of at least about 5, which process comprises mixing said room temperature vulcanizing organopolysiloxane composition with a catalyst composition comprising, by weight, (1) 100 parts of a metallic salt of an organic carboxylic acid in which the metallic ion is selected from the class consisting of lead, tin, zirconium, antimony, iron, cadmium, barium, calcium, titanium, bismuth and manganese, and in which the anion is derived from a member selected from the class consisting of aliphatic monocarboxylic acids, benzoic acid, and naphthanoic acid, (2) from 1.0 to 5,000 parts water, and (3) from 100 to 1,000 parts of a mutual solvent for said metallic salt and water, the amount and proportions of the components of said catalyst composition being selected to provide from 0.01 to 5 percent by weight of said metallic ion and from 0.01 to 0.5 percent by weight water, both of said weights being based on the weight of said linear fluid diorganopolysiloxane.

2. The process for curing a room temperature vulcanizing organopolysiloxane composition comprising, by weight, 100 parts of a linear fluid diorganopolysiloxane having the formula:

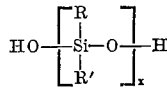

where R and R' are members selected from the class consisting of monovalent hydrocarbon radicals, halogenated monovalent hydrocarbon radicals, and cyanoalkyl radicals, and $x$ has a value of at least about 5, from 0.1 to 10 parts of an alkyl silicate selected from the class consisting of (a) monomeric organosilicates corresponding to the general formula:

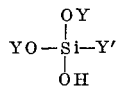

where Y is a member selected from the class consisting of alkyl groups and halogen-substituted alkyl groups and Y' is a member selected from the class consisting of alkyl groups, aryl groups, aralkyl groups, alkoxy groups, aryloxy groups and halogenated derivatives of the aforesaid alkyl, aryl, aralkyl, alkoxy and aryloxy groups and (b) liquid partial hydrolysis products of the aforementioned monomeric organo silicates and from 10 to 300 parts of a filler, which process comprises adding to the aforementioned room temperature vulcanized silicone rubber composition a catalyst composition comprising ingredients in the weight ratio of 100 parts of a metallic salt of an organic carboxylic acid in which the metallic ion is selected from the class consisting of lead, tin, zirconium, antimony, iron, cadmium, barium, calcium, titanium, bismuth, and manganese, and in which the anion of said metallic salt is derived from a member selected from the class consisting of aliphatic monocarboxylic acids, benzoic acid, and naphthanoic acid, from 1.0 to 5,000 parts water and from 100 to 1,000 parts of a mutual solvent for said metallic salt and water, the components of said catalyst composition being present in an amount to provide from 0.01 to 5.0 percent by weight, based on the weight of said linear fluid diorganopolysiloxane, of the metallic ion present in said metallic salt and from 0.01 to 0.5 percent by weight, based on the weight of said linear fluid diorganopolysiloxane, of water.

3. The process of claim 2 in which the metallic salt of an organic carboxylic acid is dibutyl tin dilaurate.

References Cited by the Examiner
UNITED STATES PATENTS

| | | | |
|---|---|---|---|
| 2,843,555 | 7/1958 | Berridge | 260—18 X |
| 2,985,545 | 5/1961 | Leavitt | 260—29.2 |
| 3,009,833 | 11/1961 | Cargill | 260—33.4 X |
| 3,069,447 | 12/1962 | Mack | 260—429.7 |
| 3,115,509 | 12/1963 | Mack | 260—429.7 |
| 3,161,614 | 12/1964 | Brown et al. | 260—46.5 |
| 3,186,963 | 6/1965 | Lewis et al. | 260—46.5 |

FOREIGN PATENTS 673,545  11/1963  Canada.

LEON J. BERCOVITZ, *Primary Examiner.*

C. W. IVY, *Assistant Examiner.*